(12) United States Patent
Halpern

(10) Patent No.: US 7,451,433 B2
(45) Date of Patent: Nov. 11, 2008

(54) SYSTEM AND METHOD FOR DESCRIPTOR CLASSES

(75) Inventor: Eric M. Halpern, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 618 days.

(21) Appl. No.: 11/088,173

(22) Filed: Mar. 23, 2005

(65) Prior Publication Data

US 2005/0262475 A1 Nov. 24, 2005

Related U.S. Application Data

(60) Provisional application No. 60/573,205, filed on May 21, 2004.

(51) Int. Cl.
*G06F 9/44* (2006.01)
(52) U.S. Cl. ...................... 717/106; 717/168
(58) Field of Classification Search ......... 717/106–109, 717/168; 707/103 R
See application file for complete search history.

(56) References Cited

U.S. PATENT DOCUMENTS

| | | | | |
|---|---|---|---|---|
| 6,163,880 | A * | 12/2000 | Ramalingam et al. | 717/104 |
| 6,327,594 | B1 | 12/2001 | Van Huben et al. | 707/200 |
| 6,360,363 | B1 | 3/2002 | Moser et al. | 717/170 |
| 6,668,371 | B2 * | 12/2003 | Hamilton et al. | 717/125 |
| 6,754,659 | B2 | 6/2004 | Sarkar et al. | 707/10 |
| 6,857,012 | B2 | 2/2005 | Sim et al. | 709/222 |
| 7,047,522 | B1 | 5/2006 | Dixon et al. | 717/131 |
| 7,127,712 | B1 | 10/2006 | Noble et al. | |
| 7,356,803 | B2 * | 4/2008 | Bau et al. | 717/116 |
| 2002/0104071 | A1 * | 8/2002 | Charisius et al. | 717/109 |
| 2002/0188935 | A1 | 12/2002 | Hertling et al. | |
| 2003/0167455 | A1 | 9/2003 | Iborra et al. | |
| 2003/0172368 | A1 * | 9/2003 | Alumbaugh et al. | 717/106 |
| 2003/0181196 | A1 * | 9/2003 | Davidov et al. | 455/414.1 |
| 2003/0182307 | A1 * | 9/2003 | Chen et al. | 707/103 X |
| 2004/0024812 | A1 | 2/2004 | Park et al. | |
| 2005/0021689 | A1 * | 1/2005 | Marvin et al. | 709/220 |
| 2005/0149555 | A1 * | 7/2005 | Wang et al. | 707/103 R |
| 2005/0154699 | A1 | 7/2005 | Lipkin et al. | |

OTHER PUBLICATIONS

Steffen Goebel et al. "Composite Component Support for EJB", Jan. 2004, Trinity College Dublin, WISICT '04, pp. 1-6.*
Richard S. Hall et al. "Gravity: Supporting Dynamically Available Services in Client-side Applications", Sep. 2003, ACM ESEC/FSC-11, vol. 28, Issue 5, pp. 379-382.*
Marshall et al. "Using Software Wisualisation to enhance Online Component Markets", Jan. 2004, Australian Computer Society, Inc, APVis '04, vol. 35, pp. 35-41.*
Nixon et al. "Programming Structures for Adaptive Ambient Systems", 2003, ACM, vol. 49, pp. 193-198.*

* cited by examiner

*Primary Examiner*—Wei Y. Zhen
*Assistant Examiner*—Anna Deng
(74) *Attorney, Agent, or Firm*—Fliesler Meyer LLP

(57) ABSTRACT

A descriptor class framework fully support a "start-from-class" approach, which defines a descriptor via a set of programmable classes defined in an object-oriented programming language. While the persistent form of a descriptor of a deployed software component is a file, the developer of an application using software component may view the descriptor as a set of programmable descriptor classes. A set of classes can be generated from a descriptor based on a set of construction rules and vise versa. Each class can be annotated, validated and customized. The descriptor class framework is also capable of determining the differences between two versions of a descriptor and notifying the changes to a corresponding class via events to a listener registered with the class.

14 Claims, 4 Drawing Sheets

SYSTEM AND METHOD FOR DESCRIPTOR CLASSES

CLAIM OF PRIORITY

This application claims priority from the following applications, which are hereby incorporated by reference in their entireties:

U.S. Provisional Patent Application No. 60/573,205, entitled SYSTEM AND METHOD FOR DESCRIPTOR CLASSES by Eric Halpern, filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of generating and processing of configuration data of deployable software components.

BACKGROUND

A descriptor (also referred to as configuration descriptor) is a persistent file (document) representing modifiable configuration data of a deployable and/or reusable software component, which can be accessible by a server or an application after the software component has been deployed. Here, a persistent file can be but is not limited to, an XML file, a text file, a formatted file, and other suitable file. Examples of existing descriptors include but is not limited to, standard J2EE (Java 2 Enterprise Edition) deployment descriptors, WLS (WebLogic Server) deployment descriptors and domain configuration descriptor (e.g., an XML file). A descriptor framework is aimed at addressing these uses as well as allowing applications to define their own descriptors.

One sticky problem for descriptor handling is to determine how to represent and access the configuration data defined in the descriptor. A descriptor can be initially defined by schemas in the persistent file (referred to as the "start-from-schema" approach), which provides more control over the forms and the contents of the descriptor. However, such an approach requires the developer of an application using a deployed software component to re-generate the program source codes and/or classes accessing the descriptor of the software component whenever a change to the schemas in the descriptor is required. Furthermore, such an approach complicates the development effort since no source codes and/or classes using the descriptor can be built and/or edited until the schemas are created and/or up to date.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention fully support a "start-from-class" approach, which defines a descriptor via a set of programmable classes defined in an object-oriented programming language. Here, the object-oriented programming (OOP) language can be but is not limited to, Java, C++, C#, and other suitable OOP language, and a programmable class (also referred to as class) can be but is not limited to, a Java bean, an interface, a module, and other suitable concepts. While the persistent form of a descriptor of a deployed software component is a file, the developer of an application using the software component may view the descriptor as a set of programmable descriptor classes. In contrast to the start-from-schema approach, such start-from-class approach hides the details of schema to class mapping and insulates the developer from the problem of authoring the schemas in the persistent file directly by allowing the developer to simply write and program against the classes. Such simple abstraction also insulates the developer from much of the descriptor handling mechanics including but is limited to data binding, validation, and update handling.

In various embodiments of a descriptor class framework, a set of classes can be generated from a descriptor based on a set of construction rules and vise versa. Each class can be validated automatically both at the time it is generated and whenever it is modified, driven mostly by constraints declared on the class definitions. It may also be extended and validated by inserted custom logic. The set of programmable classes can be generated under two embodiments: one designed for runtime when the software component is running, wherein the classes are read-only and optimized for use by the application server; and one designed for edit time when the software component is not running, wherein the classes are modifiable and can be kept in the form of an persistent file. The descriptor class framework is also capable of determining the differences between two versions of a descriptor and notifying the changes to a corresponding class via events to a listener registered with the class.

Figure 1:
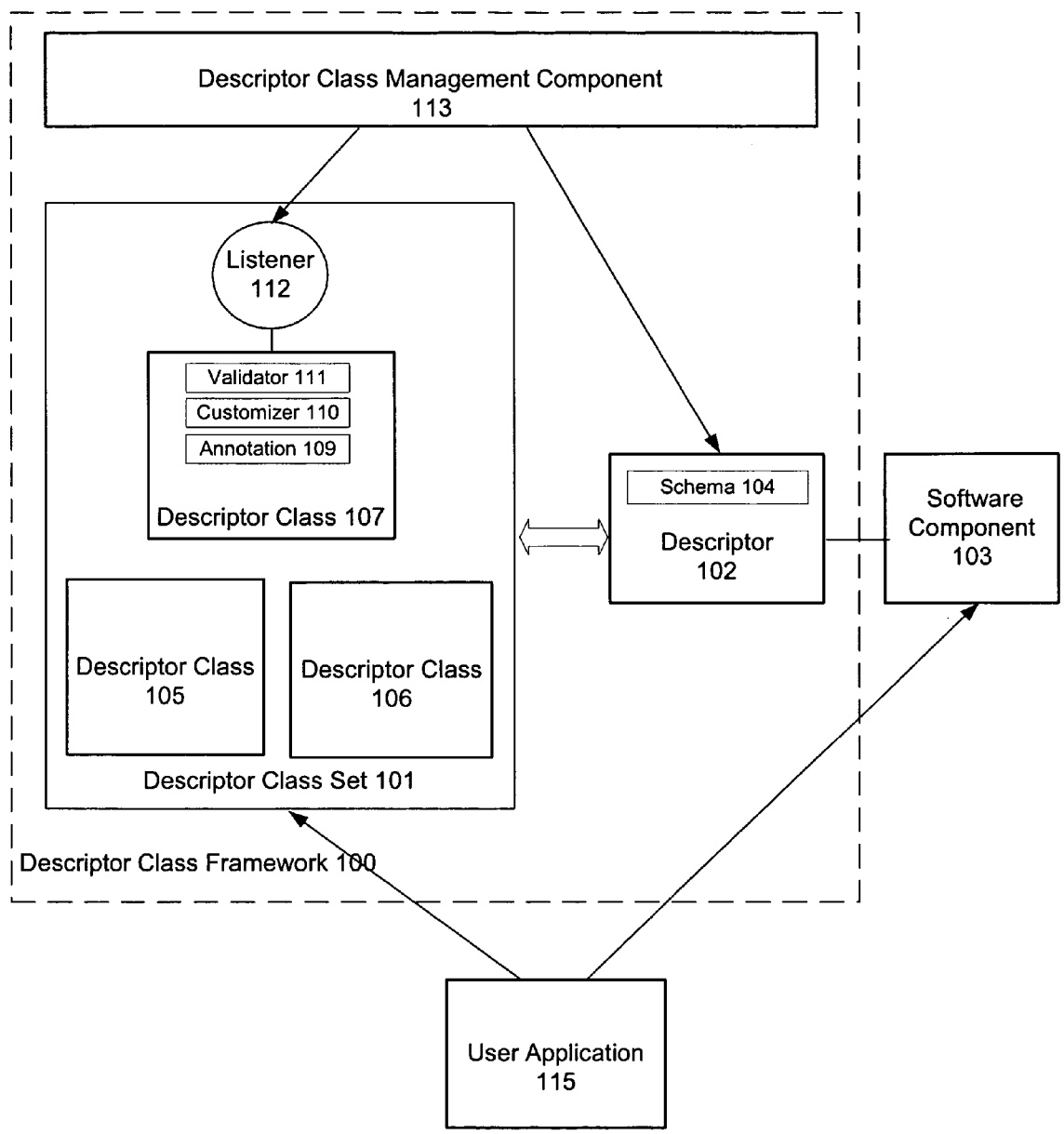
FIG. 1 is an illustration of an exemplary descriptor class framework in one embodiment of the present invention.

FIG. 1 is an illustration of an exemplary descriptor class framework in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a set of descriptor classes 101 in a descriptor class framework 100 provides to a user application 115 a class-centric programmatic view of a descriptor 102 of a software component 103 specified in a persistent file. It comprises one or more descriptor classes 105, 106, and 107, wherein each descriptor class may correspond to a portion of the descriptor such as a schema 104. In addition, each descriptor class may include optional components such as an annotation 109 that specifies a property of the descriptor class, a customizer 110 that utilizes custom logic to implement methods of the class, and a validator 111 that performs validation on the properties of the class. A descriptor class management component 113 is capable of constructing the set of descriptor classes 101 from the descriptor 102 and vise versa either at runtime or edit time by generating the class 107 from the schema 104 based a set of construction rules. The descriptor class management component 113 is further capable of comparing different versions of the descriptor and notifying a listener 112 registered with a descriptor class of proposed changes. The listener will then determine whether the descriptor class should be updated and proceed accordingly.

Figure 2:
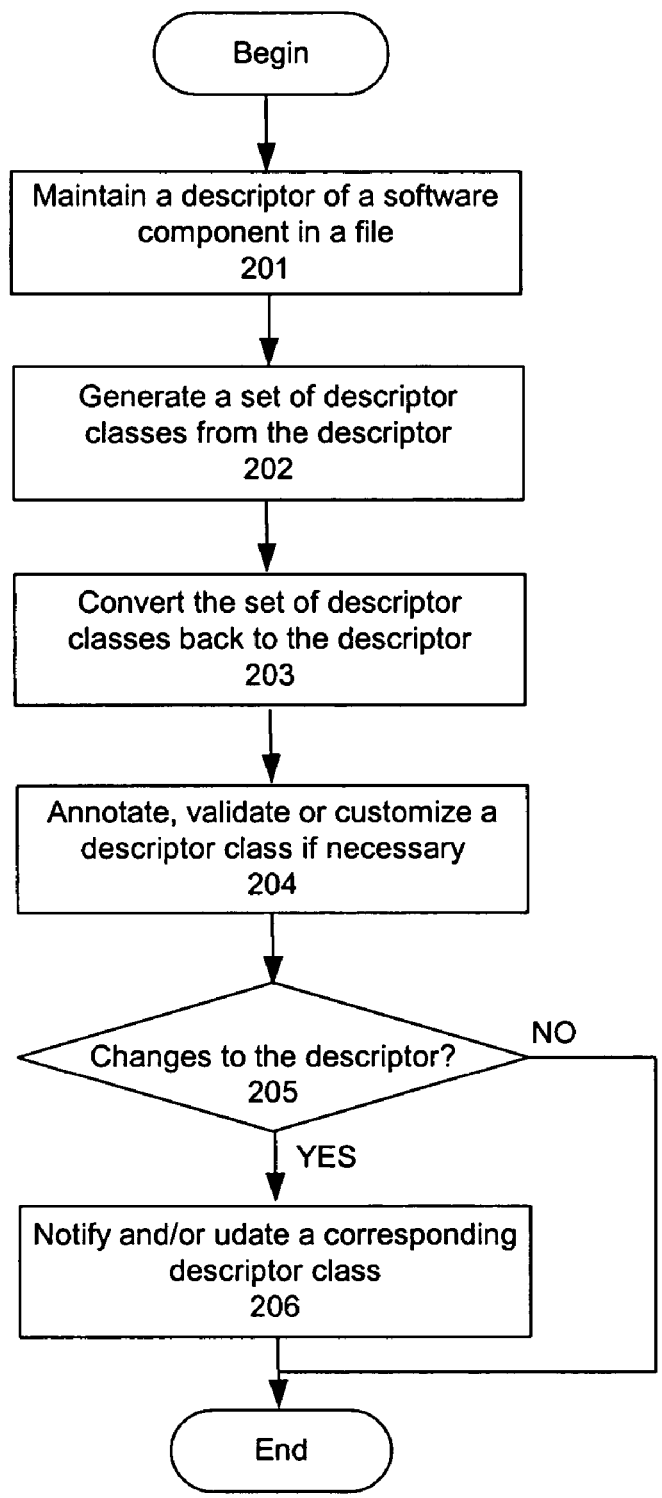
FIG. 2 is a flow chart illustrating an exemplary process to generate the set of descriptor classes in accordance with one embodiment of the invention.

FIG. 2 is a flow chart illustrating an exemplary process to generate the set of descriptor classes in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a descriptor of configuration data of a software component is maintained in a persistent file at step 201. A set of descriptor classes providing a programmatic view of the descriptor can be generated from the descriptor based on a set of construction rules at step 202. This set of descriptor classes can be converted back to the descriptor at step 203. The properties in a descriptor class can be annotated, validated or customized when necessary at step 204. If there is any changes made to the descriptor at step 205, a corresponding descriptor class may be notified and/or updated accordingly via a listener registered with the descriptor class at step 206. For illustration purposes, (descriptor) bean will be used as a non-limiting example in the following discussions.

In some embodiments, the descriptor class network can be implemented in Java to fully support a "start-from-Java" approach, wherein a set of descriptor beans (interfaces) can be generated from a descriptor file in XML format. Descriptor beans are special Java beans presenting a Java-centric model for descriptor handling. While the persistent form of a descriptor can be an XML document, the set of descriptor beans can be organized in a hierarchical structure, such as a descriptor bean graph or tree. Such start-from-Java approach is natural to a Java developer who simply writes and programs against explicit Java interfaces specified in the descriptor beans without knowing the details of the mapping between the descriptor and the set of descriptor beans. A descriptor bean graph and/or tree may be constructed from a pair of deployment-descriptor and deployment plan, which is a separate XML document that may override the value of certain elements in a descriptor, resulting in a single bean graph and/or tree that represents the merge the deployment descriptor and the plan. A descriptor tree will be used as a non-limiting example in the following discussions.

Figure 3:
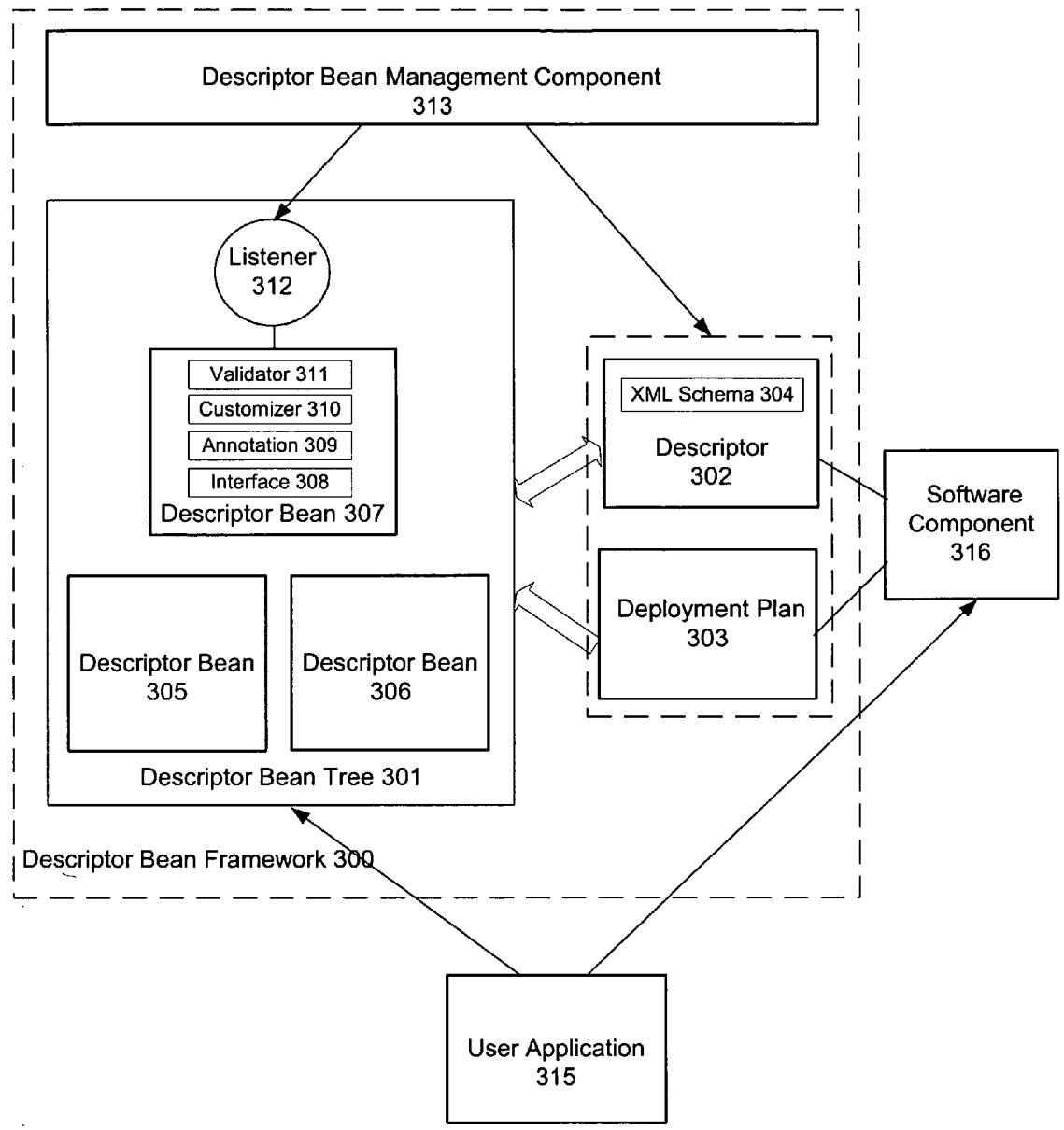
FIG. 3 is an illustration of an exemplary descriptor bean framework in one embodiment of the present invention.

FIG. 3 is an illustration of an exemplary descriptor bean framework in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 3, a descriptor bean tree 301 in a descriptor bean framework 300 provides to a user application 315 a Java-centric programmatic view of a descriptor 302 of a software component 316 specified in an XML file. The descriptor bean tree comprises one or more descriptor beans 305, 306, and 307 in a graph-like structure, wherein each interface 308 in a descriptor bean may correspond to an XML schema 304 in the descriptor. In addition, each descriptor bean may specify a set of properties and include optional components such as, annotations 309 that specify additional characteristics of these properties, a customizer 310 that utilizes custom logic to implement methods of the bean, and a validator 311 that can be associated with and validate each property of the bean. A descriptor bean management component 313 is capable of constructing the descriptor bean tree 301 from the descriptor 302 or a pair of the descriptor and a deployment plan 303 and vise versa either at runtime or edit time based a set of construction rules, wherein the deployment plan is also an XML file capable of overriding certain elements in the descriptor. The descriptor bean management component 313 is further capable of comparing different versions of the descriptor and notifying a listener 312 registered with a descriptor bean of proposed changes. The listener will then determine whether the descriptor bean should be updated and proceed accordingly.

Figure 4:
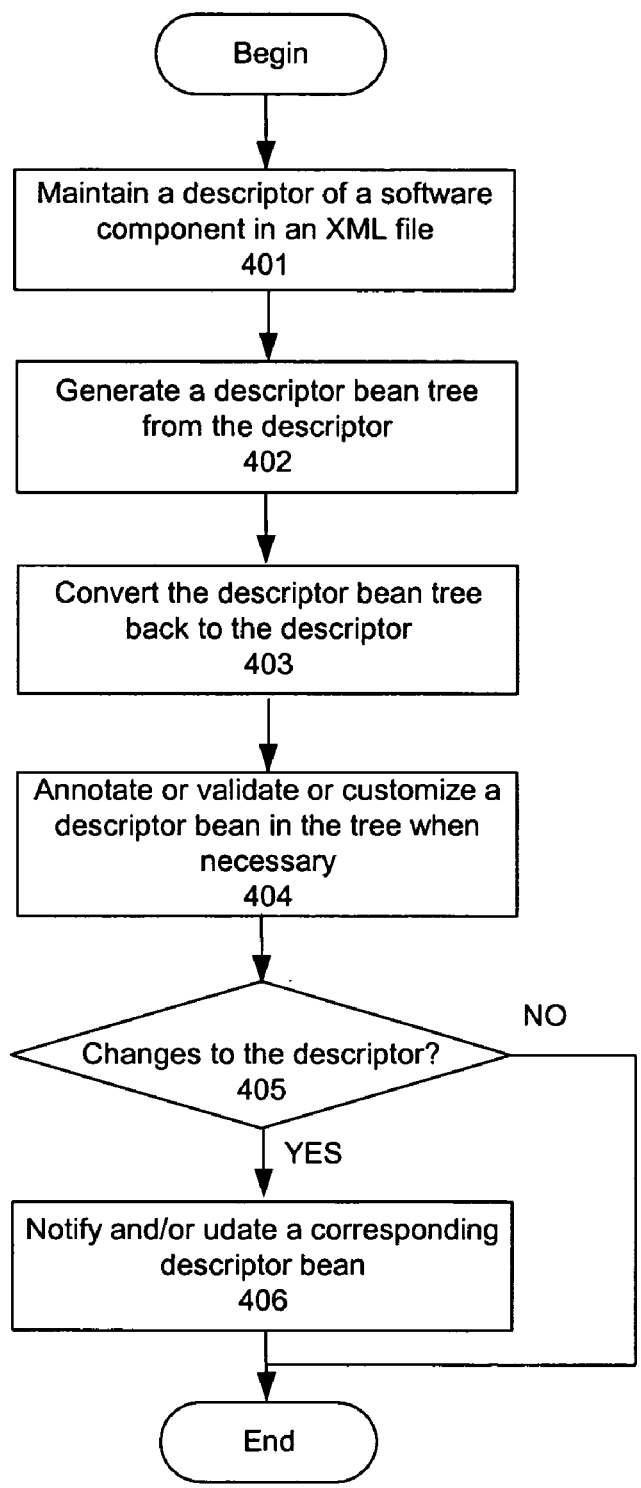
FIG. 4 is a flow chart illustrating an exemplary process to generate a descriptor bean tree from a descriptor in accordance with one embodiment of the invention.

FIG. 4 is a flow chart illustrating an exemplary process to generate a descriptor bean tree from a descriptor in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 4, a descriptor of configuration data of a software component is maintained in an XML file at step 401. A descriptor bean tree providing a programmatic view of the descriptor can be generated from the descriptor and a deployment based on a set of construction rules at step 402. This descriptor bean tree can be converted back to the descriptor at step 403. The properties in the descriptor bean tree can be annotated (with metadata) when the descriptor bean class is defined and/or its implementation is (potentially) customized, and validated when it is read from the XML file or as it is constructed in memory at step 404. If there is any changes made to the descriptor at step 405, a corresponding descriptor bean may be notified and/or updated accordingly via a listener registered with the descriptor bean at step 406.

In some embodiments, a descriptor bean can maintain a set of properties, each of which is either a simple type, an array of simple types, a reference to another descriptor bean or an array of descriptor bean references. The properties of a descriptor bean interface are specified, by and large, using standard Java bean methods. However, some additional methods are introduced to encapsulate the creation of beans and to specify the relationships between beans. Additional attributes of the descriptor bean and its properties can be specified using annotations in, e.g., Javadoc style.

In some embodiments, a simple property of a descriptor bean can be specified by a getter and a setter as follows:

<PropertyType> get<Property>( );

void set<Property>(<PropertyType> value);

If the property is a boolean, "is" rather than "get" may be used for the getter as follows:
   boolean is<Property>( );
   void set<Property>(boolean value);

In some embodiments, a read-only property of a descriptor bean is specified by a getter and the absence of a setter as follows:
   <PropertyType> get<Property>( );

In some embodiments, the descriptor bean may define additional methods for accessing these components when the type of a property is actually an array of component properties. By way of an illustration, the following ways for associating the array property with its component properties are supported in various embodiments:
Using same name for array and components:
   <PropertyType>[ ] get<Property>( );
   <PropertyType> create<Property>( );
   void destroy<Property>(<PropertyType> prop);
Use property list name for array and property name for components:
   <PropertyType>[ ] get<PropertyList>( );
   <PropertyType> create<Property>( );
   void destroy<Property>(<PropertyType> prop);

In some embodiments, a property that defines a single child bean may be specified in one of the following two ways:
If the property is read-only, it is specified using the read-only property pattern;
If the property may be set, it is specified by the following pattern:
   <PropertyType>[ ] get<PropertyList>( );
   <PropertyType> create<Property>( . . . );
   void destroy<Property>( );

where the create<Property> method instantiates the child, sets its parent and returns it, while the destroy<Property> method destroys the child by setting to property to null.

In some embodiments, a property that defines an array of child beans can be specified by the following pattern:
   <PropertyType>[ ] get<PropertyList>( );
   <PropertyType> create<Property>( . . . );
   void destroy<Property>(<PropertyType> component);

where the create<Property> method instantiates a new component, sets its parent to the defining bean, adds it to the list and returns the new component, while the destroy<Property> method removes component from the list.

In some embodiments, it also possible to define a lookup method for an array of children property as follows:
   <PropertyType> lookup<Property>(<PropertyKeyType> key);

This method will lookup a property in the list by key and return it if found. If no property is found, it will return null.

In some embodiments, a property that defines a reference to a descriptor bean that is not a child is specified by the simple property pattern where the PropertyType is a bean type. A property that defines an array of references to beans that are not children of the defining bean can be specified by the following pattern:
   <PropertyType>µl get<PropertyList>( );
   void add<Property>(<PropertyType> component);
   void remove<Property>(<PropertyType> component);

where the add<Property> method adds component to the list, while the remove<Property> method removes component from the list.

In some embodiments, any method that does not conform to one of the property methods discussed above may be considered as an operation, which is a method that must be implemented by a customizer that can be specified with @bean.customizer annotation.

In some embodiments, each property of a descriptor bean that is created new will assume an initial value according to the following rules:
Use the value of the @property.default annotation if it is present;
If no @property.default annotation is present and the property is a primitive type, use the value specified by the Java Language Specification (Initial Values of Variables).
If the property is an Array/Collection, instantiate an empty array/collection.
If the property is a child bean and no create<Property> method is present, instantiate a new bean initialized according to these rules. If a create<Property> method is present, use null.
If the property is a reference, use null.

In some embodiments, source annotations may be used while defining a descriptor bean interface, wherein each annotation has a standard form and an alias. These aliases are temporary and can be used to accommodate current interfaces.

In some embodiments, the following interface annotations can be used:
@bean abstract (alias: @abstract)
   This annotation specifies that this interface does not represent a concrete bean. Unlike a concrete bean, an abstract bean need not define a customizer even if the bean defines one or more operations. If the bean does define a customizer, the customizer is not required to implement all operations defined by the interface.
@bean customizer-custom-class-name (alias: @customizer)
   This annotation specifies a class that will customize the implementation of this interface. The customizer may define the implementation of any method specified in the bean interface simply be implementing a method with the identical name and signature. The customizer must implement all operation methods declared in the bean interface (unless the interface has been marked @abstract). It may, in addition implement property methods (e.g., get/set/add/remove/create/destroy).
@bean root
   This annotation specifies that this interface defines the root of the descriptor.

In some embodiments, the following getter annotations can be used:
@property binding
   This annotation indicates that this property defines a binding that may be changed at deployment time.
@property componentName name (alias: @componentName)
   This annotation may be used on a getter method for an array property to override the standard rules for determining the component name. When a bean defines an array property, it may also define add/remove or create/ destroy methods to manipulate components of that array. In this case, the property name is taken to be the suffix of the get method and the property component name is taken to be the suffix of the add/remove/create/destroy methods.

@property ddXPath=xpath

This annotation specifies an XPath in a standard deployment descriptor that evaluates to the standard property that will be used to initialize this property.

@property default=value (alias: @default)

This annotation specifies the default value for the property defined by this getter. May be overridden by @production-mode-default.

@property dynamic (alias: @dynamic)

This annotation indicates that this property may be updated dynamically (without redeploying).

@property key

This annotation specifies that the value of this property may be used as a key for this bean. Only one key may be specified per bean. If no key is specified, assume that the "Name" property is the key.

@property productionDefault=value (alias: productiondefault)

This annotation specifies the production-mode default value for the property defined by this getter. This will override @default when the host server is running in production mode.

@property transient

This annotation specifies that this property should not be written to XML.

In some embodiments, the following setter annotations can be used:

@property enumeration constant1[, constant2, . . . ] (alias: @legalValues)

This annotation specifies the set of discrete values to which this property can be set.

@property min number (alias: @legalMin)

This annotation specifies the minimum value to which this property can be set. It may be paired with max but cannot be used in conjunction other constraints.

@property max number (alias: @legalMax)

This annotation specifies the maximum value to which this property can be set. It may be paired with min but cannot be used in conjunction with other constraints.

@property validator custom-validator-method (alias: @legal)

This annotation specifies a custom method that will validate changes to the value of the property modified by this setter. It cannot be used in conjunction with other property constraints.

In some embodiments, automatic validation of a descriptor bean is provided whenever a descriptor is generated and/or modified. Most validation is driven by constraints declared on the definitions of a descriptor bean, which may include legal constraints (as discussed below) to be checked whenever validation is required. These constraints can be specified by property annotations on the bean interface. It is also possible to insert custom validation logic in the descriptor bean.

In some embodiments, a validation constraint can be categorized by the information it requires to be tested. There are four categories to consider:

A local constraint can be evaluated by examining a single property value. Such a constraint can be checked immediately in the setter of the constrained property. Examples: min, max, enumeration.

A cross-property constraint refers to multiple properties in a bean. Such a constraint cannot be checked until all related properties have been set. Example: a constraint that ensures that a lower bound is always smaller than an upper bound.

A cross-bean constraint refers to multiple beans in a descriptor. Such a constraint cannot be checked until all related properties in all related beans have been set. Example: all targets of a deployment must exist.

A runtime constraint refers to a state on the running system. Such a constraint can cannot be checked by looking at the descriptor beans alone.

In some embodiments, property local constraint validation will be fail-fast, e.g., the property local constraints may be evaluated in the implementation of the setter. If the validation fails, the setter will throw one of the following exceptions:

javax.management.InvalidAttributeValueException if declared

IllegalArgumentException otherwise

These checks may be switched off if performance improvement is appreciable.

In some embodiments, cross-property and cross-bean validation may require an explicit validation request. Upon that request, all validators that do non-local validation on properties that have changed should be run, which may return on first failure or accumulate all exceptions.

In some embodiments, a descriptor bean can specify a custom property validator using the property.validator annotation. It will be treated as a non-local validator and will be invoked whenever on-demand validation is requested. A custom property validator must have the following form:

```
public <ValidatorClass> {
    ...
    public void static <validateMethod>(<BeanTypeOrSuperType> bean,
        <PropertyTypeOrSuperType> propertyValue)
    throws IllegalArgumentException // or javax.management.InvalidAttributeValueException
    {
        if (not valid) {
            throw new IllegalArgumentException(...);
        }
    }
}
```

The implementation of the validator above assumes that the descriptor bean is a node in a consistent descriptor tree and is free to navigate that tree to perform validation against other properties and beans. It may not perform validation against external state external to the descriptor since this code may run in many contexts.

In some embodiments, it is possible to extend a generated descriptor bean with custom logic. The implementation of such a descriptor bean can be augmented with a customizer class, which can implement custom operations as well as extend the behavior of generated property access methods.

In some embodiments, a customizer class can be specified by the @bean.customizer annotation, which may have the following basic form:

```
public class <CustomizerClass> {
    public <CustomizerClass>(<BeanType> customized) {
        ...
    }
    // Custom methods
    ...
}
```

This class can implement an operation or extend an access method (an accessor) simply by defining the method. For any method that is defined in the bean interface and also in the customizer, the bean implementation will delegate to the customizer.

In some embodiments, the customizer can implement an operation specified in the interface by defining a method with a compatible signature. For example, the customizer would implement void hello( ) as follows:

```
public void hello ( ) {
    System.out. println("hello");
}
```

In this case, the bean implementation will delegate the call to hello to implement the customizer.

In some embodiments, the customizer may extend the implementation of an accessor by defining a method with a compatible signature. The mechanism for delegating to the custom method, however, is more complex than in the operation case. Here, it is necessary to allow the customizer to reuse the implementation of the generated bean (in order to utilize operations such as automatic default handling and validation).

In some embodiments, a descriptor bean management component is capable of using two implementations to generate a descriptor bean tree: one designed for runtime and one designed for edit time. The runtime implementation is tailored for efficient use at runtime. It is read-only to the descriptor consumer and exploits this restriction to minimize processing and memory overhead. The beans of a runtime descriptor may be updated but only through a bulk update API. Such an update is driven by a new copy of the descriptor document so there is never a need for a runtime implementation to be written out.

In some embodiments, the descriptor bean management component is capable of generating an XML schema from bean interfaces and interfaces can be generated from schema as well. For the case where there is no existing schema or no requirement to preserve an existing schema, a descriptor schema can be generated from the descriptor bean interfaces. For the case where there is an existing schema, a set of descriptor interfaces can be generated from that schema.

In some embodiments, mapping an interface in the descriptor bean to a type of a schema in order to generate the descriptor bean from the schema and verse visa can proceed based on the following rules:

```
interface FooBarBean {            <xsd:complexType name="foo-barType">
    ...                               ...
}                                 </xsd:complexType>
```

In some embodiments, a property in the descriptor bean can be mapped to an element in a schema based on the following rules:

```
FooBean getFooBar( );   <xsd:element name="foo-bar" type="foo-
                          barType" maxOccurs="1"/>
```

In some embodiments, a comment in the descriptor bean can be mapped to a section in a schema based on the following rules:

```
                              <xsd:annotation>
    /**                           <xsd:documentation>
     * Comment text               Comment text
     */                           </xsd:documentation>
                              </xsd:annotation>
```

In some embodiments, an annotation in the descriptor bean can be mapped to a section in a schema based on the following rules:

```
/**                           <xsd:simpleType>
 * @property min = 2              <xsd:restriction base='xsd:integer'>
 */                                   <xsd:minInclusive value = '2'/>
void setIntProperty(int value);   </xsd:restriction>
                              </xsd:simpleType>
/**                           <xsd:simpleType>
 * @property max = 10             <xsd:restriction base='xsd:integer'>
 */                                   <xsd:maxInclusive value = '10'/>
void setIntProperty(int value);   </xsd:restriction>
                              </xsd:simpleType>
/**                           <xsd:simpleType>
 * @property enumeration =        <xsd:restriction base = 'xsd:string'>
```

-continued

```
"one", "two", "three"              <xsd:enumeration value="one">
*/                                  <xsd:enumeration value="two">
void setStringProperty(String       <xsd:enumeration value="three">
value);                                 </xsd:restriction>
                                    </xsd:simpleType>
                                    <xsd:annotation>
                                        <xsd:appinfo xmIns:wld=". . .">
/**                                     <property
    * @property validator =               validator="foo.bar.ConstaintHelp
Helper.legalCheck                         er.legalCheck"
    */                                  />
                                    </xsd:appinfo>
                                    </xsd:annotation>
```

In some embodiments, there can be two options to consider for mapping a property key definition in java to Schema:
Option 1—define the type of the key element as xsd:ID.

```
interface FooBean {                <xsd:complexType name="fooType">
    /**                                <xsd:sequence>
        * @property key                    <xsd:element name="name"
        */                                     type="xsd:ID" minOccurs="1"
    String getName( );                     maxOccurs="1 ">
}                                          . . .
                                       </xsd:sequence>
```

This mapping is easy to express in schema but it has a couple of important limitations. The first is that an xsd:ID must be globally unique. The second is that the key type is limitted to xsd:ID (essentially a string).
Option 2—use an xsd:key definition.

```
interface BarBean {                <xsd:complexType name="barType">
FooBean[ ] getFoos( );                 <xsd:sequence>
FooBean createFooBean(. . .);              <xsd:element name="foo" type="fooType"
}                                              maxOccus="unbounded"/>
interface FooBean {                    . . .
/** * @property key                    </xsd:sequence>
    */                                 <xsd:key name="fooKey">
String getName( );                         <xsd:selector xpath="foo"/>
}                                          <xsd:field xpath="name"/>
                                       </xsd key>
                                   </complexType>
                                   <xsd:complexType name="fooType">
                                       <xsd:sequence>
                                           <xsd:element name="name"
                                               type="xsd:string"/>
                                           . . .
                                       </xsd:sequence>
                                   </xsd:complexType>
```

This mapping is more complicated in that it requires the key definition to be made on the enclosing type of the type whose key is defined. The advantages, however, are that the key only need be unique among other elements in the list and that an existing element may be used for the key.

In some embodiments, a deployment plan can be a separate XML document that allows an administrator to override certain deployment descriptor settings without modifying the original descriptor. A descriptor bean tree may be constructed from a deployment-descriptor/plan pair. This results in a single bean tree that represents the merge the deployment descriptor and plan.

In some embodiments, the fact that a property value can be specified externally via a plan is hidden from the caller of the getter—it will return the final value. In order to trace the source of a property value, a special method will be provided on the bean to determine if a property value is obtained from a plan.

In some embodiments, only properties that are explicitly assigned a variable in the descriptor can be eligible to be specified by a plan. Such overridible properties can be marked by tracking which properties are so designated in the descriptor and making this information available to an editing tool.

In some embodiments, a tool can be provided to generate an XML schema from annotated Java classes. The resulting schema should be in J2EE-style. In particular:

Each property should be an element (unless otherwise specified by annotation).

Element names should be lowercase and hyphen separated.

Minimally, the following information should be reflected in the schema:

Complete type tree

Class and getter comments (mapped to appropriate schema documentation)

Legal constraints as defined by @property.min, @property.max, glegal.property.enumeration (mapped to facet). The primary reason to translate these into the schema is completeness.

In some embodiments, descriptor bean interfaces may use the naming pattern <Prefix>Bean (as in MethodBean) to map a schema type name to a Java interface name. J2EE descriptor schema type names, on the other hand, use the pattern <prefix>Type (as in methodType) to perform the mapping.

In some embodiments, the server configuration framework is careful not to write out properties (or whole descriptor bean) to an XML document that reflect only default values. This feature reduces the clutter in the XML document considerably and maintains a clear record of what the editor has actually changed.

In some embodiments, it should be possible to update a descriptor based on a new version of an XML document while a runtime descriptor cannot be directly modified by callers. A mechanism can be provided to apply such an update in two phases: the first phase will allow for listeners to validate the proposed change against any existing runtime constraints, the second phase will notify listeners that the change has taken effect.

In some embodiments, the edit time implementation can be modifiable and maintains the form of the XML document. The configuration (edit) time implementation is tailored for use by configuration tools. It implements the entire range of methods and provides high-fidelity mapping to/from the descriptor document.

In some embodiments, the process of reading an descriptor document (XML) into an editable tree of descriptor beans, performing some modification on it and then writing it back out should result in minimal change to the document. Only the changes made to the bean tree should be reflected as changes in the document. In particular, comments and the order of unchanged elements and attributes will be preserved.

In some embodiments, a bean property may not show up in the XML document if it is using the default value (e.g., it has not been explicitly set). If the property is a bean whose default value is non-null, and the property values of that bean are all the default values, it should not show up in the XML document. The origin of a property value can be provided in a programmatic way by one of the following: an XML descriptor, a plan, or by the default value. A property can also be restored to its default value, and the current state of the bean tree can be validated in a programmatic way.

In some embodiments, the set of allowed changes at the bean class definition time may be limited if there is a schema already defined and published. In some cases, the schema may be fixed (as with standard J2EE descriptors). In other cases, only changes that conform to schema evolution rules may be allowed (e.g., allow addition, disallow deletion, disallow name changes). Two options are provided in addition to generate schema to accommodate these cases: the first will signal an error if any change has been made to the descriptor interfaces that causes a schema change; the second will signal an error if any change to descriptor interfaces causes a schema change that breaks schema evolution rules.

In some embodiments, a mechanism can be provided to determine the difference between two versions of a descriptor and fire change events to listeners registered with descriptor beans. The runtime implementation of a descriptor is not directly modifiable, e.g., calling a setter may result in an UnsupportedOperationException. However, a descriptor can be modified indirectly. Such updates to a descriptor during runtime may occur in two phases:

Prepare—In this phase, listeners registered with descriptor beans are notified of the proposed changes and given a chance to vote. If any listener votes no, the update will be aborted. In this phase, no changes are made to the active descriptor tree.

Activate—If no listeners veto the proposal, the update is then activated. At this point, the appropriate changes are made to the active descriptor tree. Once these changes have been made, all registered listeners are notified of the newly activated changes.

In some embodiments, the active descriptor tree can be updated in place when an update is activated. This has two important implications. The first is that a descriptor consumer can process descriptor changes lazily, e.g., it needs not to register listeners, for non-limiting examples, BeanUpdateListeners to support dynamic change at runtime (under certain circumstances). Lazy processing of updates is possible however, only for properties that do not have dependencies on other properties. Whenever an atomic view is required, the consumer must use a BeanUpdateListener. The second is that the consumer's view of the update is not atomic in the activate window.

In some embodiments, a descriptor consumer may need to ensure that property changes are processed in a certain order both within a bean and across beans. Delivering all bean change in a single event addresses the first need. To address the second, the order in which listeners are fired may be controlled by the order in which they are registered. For a non-limiting example, bean A may depend on another bean B. If the changes to A are activated before the changes to B, A may not be able to activate properly. The following mechanism is provided to control the order in which notifications are fired with: BeanUpdateListeners are ordered according to the registration time across a descriptor. When a bulk change is processed, the affected listeners are fired in the registration order.

In some embodiments, a descriptor consumer may register a listener such as BeanUpdateListeners to participate in both phases of an update and be notified of exact changes. A BeanUpdateListener defines two methods: prepareUpdate( ) and activateUpdate( ), both guarantee an atomic view of the descriptor tree. Any processing that requires this level of isolation should be done within the context of one of these listeners.

In some embodiments, a non-limiting example such as PropertyChangeListener can be fired at the change notification granularity of once for each property change. This model may not work well for bulk change (descriptor update). When a bulk change occurs, there may be changes to several properties in the same bean. If these properties are interrelated, the container may respond to many changes in the same way. For this reason, a single event is passed to the BeanUpdateListener that contains the list of property changes that are a part of the bulk update.

In some embodiments, the listener can be called whenever one or more properties on the source bean are changed as part of an update. Unlike PropertyChangeListeners, each listener method is called once with a list of property changes rather than separately for each property change. This is done to give the listener control over the order in which changes are processed and to simplify the case where several property changes result in the same action.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, class, method, type, interface, component, object model, and other suitable concepts. While the concept "interface" is used in the embodiments of the systems and methods described above, it will be evident that such concept can be interchangeably used with equivalent concepts such as, bean, class, method, type, component, object model, and other suitable concepts. While the concept "instance" is used in the embodiments of the systems and methods described above, it will be evident that such concept can be interchangeably used with equivalent concepts such as, object, and other suitable concepts. While the concept "property" is used in the embodiments of the systems and methods described above, it will be evident that such concept can be interchangeably used with equivalent concepts such as, attribute, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented system stored on a computer readable medium to provide a descriptor class framework, comprising:
    a descriptor capable of representing modifiable configuration data of a software component in persistent data;
    one or more descriptor classes, wherein each of the one or more descriptor classes is capable of maintaining one or more properties corresponding to a portion of the descriptor;
    a descriptor class management component capable of:
        generating and/or updating the one or more descriptor classes from the descriptor; and
        generating and/or updating the descriptor from the one or more descriptor classes; and
    a listener registered with the descriptor class capable of:
        accepting notification of a proposed change to the descriptor from the descriptor class management component;
        determining whether to update the descriptor class with the proposed change; and
        updating the descriptor class with the proposed change, wherein each of the one or more descriptor classes can further comprise:
    an annotation capable of:
        defining one of the one or more properties; and
        defining a getting and/or setting method of one of the one or more properties;
    a validator capable of validating the one or more properties based on one or more constraints either at parse time or whenever the descriptor class is modified; and
    a customizer capable of implementing and/or extending the implementation of a software interface with a custom logic inserted in the descriptor class; and
    generating and/or updating the descriptor class via the following implementations:
        a runtime implementation, which is read-only and optimized for efficiency at runtime; and
        a edit time implementation, which is modifiable maintains in an XML document.

2. The computer-implemented system according to claim 1, wherein:
    the persistent data can be organized in one of an XML file, a text file, and a formatted file.

3. The computer-implemented system according to claim 1, wherein:
    a descriptor class of the one or more descriptor classes can be defined by an object-oriented programming language.

4. The computer-implemented system according to claim 1, wherein:
    the one or more descriptor classes can be organized in a hierarchical structure, wherein the hierarchical structure can be a graph or a tree.

5. The computer-implemented system according to claim 1, wherein:
    each of the one or more properties can be one of a simple type, an array of simple types, a reference to a descriptor class in the one or more descriptor classes, and an array of references to the one or more descriptor classes.

6. The computer-implemented system according to claim 1, further comprising:
    a deployment plan, which can be an XML file, capable of overriding at least one of the one or more properties without modifying the one or more descriptor classes.

7. The computer-implemented system according to claim 6, wherein:
the descriptor class management component is capable of generating and/or updating the one or more descriptor classes from the deployment plan.

8. The computer-implemented system according to claim 1, wherein:
the descriptor class management component is further capable of comparing the differences between two or more versions of the descriptor; and notifying a descriptor class in the one or more descriptor classes of a proposed change.

9. A computer-implemented method to provide a descriptor class framework, comprising:
representing modifiable configuration data of a software component via a descriptor in a persistent file;
containing one or more descriptor classes in a hierarchical structure via a descriptor class set, wherein a descriptor class of the one or more descriptor classes can be defined by an object-oriented programming language and is capable of maintaining one or more properties corresponding to a portion of the descriptor;
performing the following via a descriptor class management component:
generating and/or updating the hierarchical structure of the one or more descriptor classes from the descriptor; and
generating and/or updating the descriptor from the hierarchical structure of the one or more descriptor classes;
performing the following via a listener registered with the descriptor class:
accepting notification of a proposed change to the descriptor from the descriptor class management component;
determining whether to update the descriptor class with the proposed change; and
updating the descriptor class with the proposed change;
defining one of the one or more properties via an annotation in the descriptor class;
defining a getting and/or setting method of one of the one or more properties via an annotation in the descriptor class;
validating the one or more properties based on one or more constraints either at parse time or whenever the descriptor class is modified;
implementing and/or extending the implementation of a software interface with a custom logic inserted in the descriptor class; and
generating and/or updating the descriptor class via the following implementations:
a runtime implementation, which is read-only and optimized for efficiency at runtime; and
a edit time implementation, which is modifiable maintains in an XML document.

10. The computer-implemented method according to claim 9, further comprising:
overriding at least one of the one or more properties without modifying the descriptor via a deployment plan, which can be an XML file; and
generating and/or updating the descriptor class from the deployment plan.

11. The computer-implemented method according to claim 9, further comprising:
comparing the differences between two or more versions of the descriptor; and notifying the descriptor class of a proposed change.

12. The computer-implemented method according to claim 11, further comprising:
performing at least one of the following via a listener registered with the descriptor class:
accepting notification of a proposed change to the descriptor from the descriptor class management component;
determining whether to update the descriptor class with the proposed change; and
updating the descriptor class with the proposed change.

13. A machine readable medium having instructions stored thereon that when executed cause a system to:
represent modifiable configuration data of a software component as an XML file;
contain one or more descriptor classes in a tree structure via a descriptor class graph and/or tree, wherein a descriptor class of the one or more descriptor classes is a software interface capable of maintaining one or more properties corresponding to an XML schema in the XML file in the descriptor;
perform the following via a descriptor class management component:
generating and/or updating the descriptor class graph and/or tree from the descriptor via generating and/or updating the interface from the XML schema; and
generating and/or updating the descriptor from the descriptor class graph and/or tree via generating and/or updating the XML schema from the interface;
perform the following via a listener registered with the descriptor class:
accepting notification of a proposed change to the descriptor from the descriptor class management component;
determining whether to update the descriptor class with the proposed change; and
updating the descriptor class with the proposed change;
define one of the one or more properties via an annotation in the descriptor class;
define a getting and/or setting method of one of the one or more properties via an annotation in the descriptor class;
validate the one or more properties based on one or more constraints either at parse time or whenever the descriptor class is modified;
implement and/or extending the implementation of a software interface with a custom logic inserted in the descriptor class; and
generate and/or updating the descriptor class via the following implementations:
a runtime implementation, which is read-only and optimized for efficiency at runtime; and
a edit time implementation, which is modifiable maintains in an XML document.

14. A computer-implemented system stored on a computer readable medium to provide a descriptor object framework, comprising:
means for representing modifiable configuration data of a software component via a descriptor in persistent data;
means for performing the following via a descriptor class management component:
generating and/or updating one or more descriptor classes from the descriptor, wherein each of the one or more descriptor classes is capable of
maintaining one or more properties corresponding to a portion of the descriptor; and
generating and/or updating the descriptor from the one or more descriptor classes;

means for performing the following via a listener registered with the descriptor class:
  accepting notification of a proposed change to the descriptor from the descriptor class management component;
  determining whether to update the descriptor class with the proposed change; and
  updating the descriptor class with the proposed change;
means for defining one of the one or more properties via an annotation in the descriptor class;
means for defining a getting and/or setting method of one of the one or more properties via an annotation in the descriptor class;
means for validating the one or more properties based on one or more constraints either at parse time or whenever the descriptor class is modified;
means for implementing and/or extending the implementation of a software interface with a custom logic inserted in the descriptor class; and
means for generating and/or updating the descriptor class via the following implementations:
  a runtime implementation, which is read-only and optimized for efficiency at runtime; and
  a edit time implementation, which is modifiable maintains in an XML document.

* * * * *

UNITED STATES PATENT AND TRADEMARK OFFICE
CERTIFICATE OF CORRECTION

| | | |
|---|---|---|
| PATENT NO. | : 7,451,433 B2 | Page 1 of 1 |
| APPLICATION NO. | : 11/088173 | |
| DATED | : November 11, 2008 | |
| INVENTOR(S) | : Halpern | |

It is certified that error appears in the above-identified patent and that said Letters Patent is hereby corrected as shown below:

On the Title page, in field (56), under "Other Publications" in column 2, line 6, delete "Wisualisation" and insert -- Visualisation --, therefor.

In column 5, line 65, delete ">µl" and insert -- >☐ --, therefor.

In column 6, line 42, delete "customizer-custom" and insert -- customizer=custom --, therefor.

In column 7, lines 25–26, after "(alias:" delete "productiondefault)" and insert
-- @productiondefault) --, therefor.

In column 9, line 38, delete "System.out. println" and insert -- System.out.println --, therefor.

In column 11, line 33, delete "limitted" and insert -- limited --, therefor.

In column 11, line 47, delete "</xsd key>" and insert -- </xsd:key> --, therefor.

In column 13, line 14, delete "glegale." and insert -- @legal. --, therefor.

Signed and Sealed this

Eleventh Day of May, 2010

David J. Kappos
*Director of the United States Patent and Trademark Office*